United States Patent
van Dijk

(10) Patent No.: US 12,212,430 B2
(45) Date of Patent: Jan. 28, 2025

(54) CONTROLLER AREA NETWORK TRANSCEIVER AND METHOD FOR THE TRANSCEIVER

(71) Applicant: NXP B.V., Eindhoven (NL)

(72) Inventor: Lucas Pieter Lodewijk van Dijk, Kranenburg (DE)

(73) Assignee: NXP B.V., Eindhoven (NL)

( * ) Notice: Subject to any disclaimer, the term of this patent is extended or adjusted under 35 U.S.C. 154(b) by 85 days.

(21) Appl. No.: 18/164,355

(22) Filed: Feb. 3, 2023

(65) Prior Publication Data
US 2023/0269111 A1 Aug. 24, 2023

(30) Foreign Application Priority Data
Feb. 23, 2022 (EP) .................................. 22158251

(51) Int. Cl.
*H04L 12/40* (2006.01)
*G06F 11/07* (2006.01)

(52) U.S. Cl.
CPC .......... *H04L 12/40* (2013.01); *G06F 11/0745* (2013.01); *G06F 11/0751* (2013.01); *H04L 2012/40215* (2013.01)

(58) Field of Classification Search
CPC .......... H04L 12/40; H04L 2012/40215; G06F 11/0745; G06F 11/0751
See application file for complete search history.

(56) References Cited

U.S. PATENT DOCUMENTS

| | | | |
|---|---|---|---|
| 8,667,123 B2 | 3/2014 | Orton et al. | |
| 9,568,533 B2 | 2/2017 | Jiang et al. | |
| 10,884,069 B2 | 1/2021 | Hubbard et al. | |
| 11,258,630 B2* | 2/2022 | Wojciechowski | .... H04L 7/0079 |
| 2004/0158781 A1 | 8/2004 | Pihet | |
| 2016/0119184 A1 | 4/2016 | Soriaga et al. | |
| 2020/0287746 A1* | 9/2020 | Kotani | .............. H04L 12/40143 |
| 2022/0181868 A1* | 6/2022 | Lee | ......................... H04L 12/40 |

FOREIGN PATENT DOCUMENTS

| | | |
|---|---|---|
| EP | 1355456 A1 | 10/2003 |
| EP | 3338625 A1 | 6/2018 |

* cited by examiner

*Primary Examiner* — Janice N Tieu

(57) ABSTRACT

The present invention relates to a controller area network, CAN, transceiver comprising a monitoring unit configured to execute either a first process for detecting an error at the CAN signal lines or a different second process for detecting an error at the transceiver or the CAN signal lines depending on a mode of the CAN transceiver detected by the monitoring unit. The present invention also relates to a method for the CAN transceiver.

20 Claims, 7 Drawing Sheets

CONTROLLER AREA NETWORK TRANSCEIVER AND METHOD FOR THE TRANSCEIVER

CROSS-REFERENCE TO RELATED APPLICATIONS

This application claims the priority under 35 U.S.C. § 119 of European patent application No. 22158251.3, filed Feb. 23, 2022, the contents of which are incorporated by reference herein.

TECHNICAL FIELD

The present disclosure relates to a controller area network, CAN, transceiver and a method for the CAN transceiver.

BACKGROUND

CAN buses can be used for communications within vehicles. CAN bus is a message-based communications bus that is often used within automobiles. It will be appreciated that CAN buses also have application outside of the field of automobiles. A CAN bus network may include multiple bus devices, so called nodes or electronic control units (ECUs), such as an engine control module (ECM), a power train control module (PCM), airbags, antilock brakes, cruise control, electric power steering, audio systems, windows, doors, mirror adjustment, battery and recharging systems for hybrid/electric cars, and many more. A CAN protocol is used to enable communications between the various bus devices. The data link layer of the CAN protocol is standardized as International Standards Organization (ISO) 11898-1:2003. CAN Flexible Data-Rate or "CAN FD," which is an extension of the standardized CAN data link layer protocol and is meanwhile integrated into the ISO11898-1:2015 standard, can provide higher data rates. The standardized CAN data link layer protocol is being further extended to provide even higher data rates. A further extension, referred to as CAN XL, with a new level scheme allowing even higher data rates is in the definition phase discussed under CiA610 (CAN in Automation) and is moving towards standardization in the form of either a further update of the existing ISO11898 standards or a new standard.

SUMMARY

Aspects of the disclosure are defined in the accompanying claims.

In accordance with a first aspect of the present disclosure, a controller area network, CAN, transceiver is provided. The CAN transceiver comprising: a CAN BUS interface with a first terminal designed for connection to a first CAN signal line and a second terminal designed for connection to a second CAN signal line; a digital interface for receiving a digital signal representing a sequence of data bits; a signal generation unit connected to the two terminals and configured to generate a differential voltage signal between the terminals; a control unit; and a monitoring unit; wherein the control unit is configured to control the signal generation unit based on a received digital signal such that a CAN signal representing the data bits of the received digital signal is generated at the CAN BUS interface; wherein the monitoring unit is configured to detect whether the CAN transceiver is either in a transmitting mode in which the control unit controls the signal generating unit to generate the CAN signal, or in a non-transmitting mode; and wherein monitoring unit is configured to execute either a first process for detecting an error at the CAN signal lines or a second process for detecting an error at the transceiver or the CAN signal lines depending on the mode of the CAN transceiver detected by the monitoring unit, wherein the first process and the second process are different.

In one or more embodiments, the transceiver is configured to change from a working mode, in which the transceiver is ready to transmit signals, to a sleep mode, in which the transceiver is not ready to transmit but is ready to receive a signal, and to change vice versa, wherein the monitoring unit is configured to detect whether the transceiver is in either a working mode or the sleep mode, and wherein the monitoring unit is configured to execute the first or second process only in the working mode.

In one or more embodiments, the monitoring unit is configured to execute the first process for error detection in non-transmitting mode and the second process for error detection in transmitting mode.

In one or more embodiments, the monitoring unit comprises a processing unit (144).

In one or more embodiments, the monitoring unit comprises a control circuit (146) controllable by the processing unit, wherein a first electrical impedance of the transceiver between the first terminal and a first voltage supply node (168) of the transceiver can be enabled or disabled by the monitoring unit via the control circuit, and wherein a second electrical impedance of the transceiver between the second terminal and a second voltage supply node (166) of the transceiver can be enabled or disabled by the monitoring unit via the control circuit.

In one or more embodiments, the monitoring unit is configured to execute the first process comprising the following steps A1) and A2):
  A1) Detecting a first voltage at the first terminal using a sensor unit (148) of the monitoring unit,
  A2) Detecting a second voltage at the second terminal using the sensor unit, wherein the monitoring unit is configured to further execute the following steps A3) to A5) in the first process if the first voltage from step A1) corresponds to a first reference voltage and the second voltage from step A2) deviates from the first reference voltage:
  A3) Activating the first and second impedance by controlling the control circuit using the processing unit,
  A4) Detecting again the first voltage using the sensor unit after activation of the first and second impedance,
  A5) Determining an error as a first error using the processing unit if the first voltage detected in step A4) is smaller than the first reference voltage, wherein the first error represents an open wire at the first CAN signal line.

In one or more embodiments, the monitoring unit is configured to further execute the following steps B1) to B3) in the first process if the second voltage from step A2) corresponds to the first reference voltage and the first voltage from step A1) differs from the first reference voltage:
  B1) Activating the first and second impedance by controlling the control circuit using the processing unit,
  B2) Detecting again the second voltage using the sensor unit after activation of the first and second impedance,
  B3) Determining an error as a second error using the processing unit if the second voltage detected in step B2) is smaller than the first reference voltage, wherein the second error represents an open wire at the second CAN signal line.

In one or more embodiments, the monitoring unit is configured to execute the following steps in the second process:
- C1) Sequential detecting a bit duration of each bit of the bit sequence represented by the digital input signal,
- C2) Detecting a sub-sequence from at least one bit of the bit sequence, wherein each bit of the sub-sequence is a dominant bit and the total duration of the sub-sequence is at least a predetermined reference time, wherein the monitoring unit is configured to further execute, in the second process, the following steps in a period of time while the bits of the sub-sequence are represented by CAN signal at the terminals generated by the signal generating unit:
- C3) Detecting a first electric current flowing through the first terminal using the sensor unit,
- C4) Detecting a second electric current flowing through the second terminal using the sensor unit, wherein the monitoring unit is configured to further execute the following step in the second process:
- C5) Determining a difference current using the processing unit, the difference current representing the difference between the first current and the second current.

In one or more embodiments, a third electrical impedance of the transceiver between the first terminal and the first voltage supply node of the transceiver can be enabled or disabled by the monitoring unit via the control circuit, wherein a fourth electrical impedance of the transceiver between the second terminal and the first voltage supply node of the transceiver can be enabled or disabled by the monitoring unit via the control circuit, and wherein the monitoring unit is configured to further execute the following steps in the second process if the difference current from step C5) is less than a first predetermined reference current:
- D1) Activating the third and fourth impedance by controlling the control circuit through the processing unit,
- D2) Detecting a third voltage at the first terminal using the sensor unit,
- D3) Detecting a fourth voltage at the second terminal using the sensor unit,
- D4) Determining a first difference voltage using the processing unit, the first difference voltage representing the difference between the third voltage and the fourth voltage,
- D5) Determining an error as a third error using the processing unit if the first difference voltage determined in step D4) is at least a second reference voltage, wherein the third error representing an electrical short between the first terminal and the second voltage supply node of the transceiver.

In one or more embodiments, the monitoring unit is configured to further execute the following step D6) in the second process if the first difference voltage determined in step D4) is less than the second reference voltage:
- D6) Determining an error as a fourth error using the processing unit if the first difference voltage determined in step D4) is less than the second reference voltage, wherein the fourth error representing an electrical short between the second terminal and the second voltage supply node of the transceiver.

In one or more embodiments, a fifth electrical impedance of the transceiver between the first terminal and the second voltage supply node of the transceiver can be enabled or disabled by the monitoring unit via the control circuit, wherein a sixth electrical impedance of the transceiver between the second terminal and the second voltage supply node of the transceiver can be enabled or disabled by the monitoring unit via the control circuit, and wherein the monitoring unit is configured to further execute the following steps in the second process if the difference current from step C5) is greater than a second predetermined reference current, wherein the second reference current is greater than the first reference current:
- E1) Activating the fifth and sixth impedance by controlling the control circuit through the processing unit,
- E2) Detecting a fifth voltage at the first terminal using the sensor unit,
- E3) Detecting a sixth voltage at the second terminal using the sensor unit,
- E4) Determining a second difference voltage representing the difference between the fifth voltage and the sixth voltage using the processing unit,
- E5) Determining an error as a fifth error if the second difference voltage determined in step E4) is less than a third reference voltage, that is higher than the second reference voltage, using the processing unit, wherein the fifth error represents an electrical short between the first terminal and a first voltage supply node of the transceiver.

In one or more embodiments, the monitoring unit is configured to further execute the following step E6) in the second process if the second difference voltage determined in step E4) is at least the third reference voltage:
- E6) Determining an error as a sixth error if the second difference voltage determined in step E4) is at least the third reference voltage using the processing unit, wherein the sixth error represents an electrical short between the second terminal and the second voltage supply node of the transceiver.

In one or more embodiments, the monitoring unit is configured to further execute the following step in the second process:
- F1) Determining a sum current using the processing unit, wherein the sum current represents the sum of the first current from step C3) and the second current from step C4), wherein the monitoring unit is configured to further execute the following steps in the second process if the sum current is less than a third reference current and further if the difference current from step C5) is greater than the fourth reference current and less than a fifth reference current:
- F2) Detecting a first voltage signal using the sensor unit and the processing unit, the first voltage signal representing an electrical voltage at the first terminal over at least a predetermined, first time period,
- F3) detecting a second voltage signal using the sensor unit and the processor unit, the second voltage signal representing an electrical voltage at the second terminal over at least the first time period,
- F4) Analyzing a first waveform of the first voltage signal and a second waveform of the second voltage signal using the processing unit,
- F5) Determining an error as a seventh error using the processing unit if the first waveform represents a toggling voltage comprising a voltage amplitude of at least a fourth reference voltage and further if the second waveform represents a constant voltage, wherein the seventh error represents an open wire at the first signal line.

In one or more embodiments, the monitoring unit is configured to further execute the following step F6) in the second process if the first waveform represents a constant voltage:

F6) Determining an error as a eights error using the processing unit if the second waveform represents a toggling voltage comprising an voltage amplitude of at least the fourth reference voltage and further if the first waveform represents a constant voltage, wherein the eights error representing an open wire at the second signal line.

In one or more embodiments, the monitoring unit is configured to execute the following step in the second process:

G1) Determining an error as an ninth error using the processing unit if the sum current from step F1) is greater than a sixth reference current, and if further the difference current from step C5) is between the fourth reference current and the fifth reference current, and further if the first or second voltage difference from steps D4) and E4) are between a fifth reference voltage and the fourth reference voltage, respectively, wherein the ninth error represents an electrical short between the first and second signal lines.

In accordance with a second aspect of the present disclosure, a method for error detection at a CAN transceiver or at CAN signal lines connectable to the transceiver is provided, wherein the transceiver comprises a CAN BUS interface, a digital interface, a signal generation unit, a control unit and a monitoring unit, wherein the CAN BUS interface comprises a first terminal configured to be connected to a first CAN signal line and a second terminal configured to be connected to a second CAN signal line, wherein the digital interface is configured to receive a digital signal representing a sequence of data bits, wherein the signal generation unit is connected to the two terminals and configured to generate a differential voltage signal between the terminals, and wherein the method comprises the following steps:

Controlling the signal generation unit using the control unit based on the received digital signal so that a CAN signal representing the data bits is generated at the CAN BUS interface;

Detecting using the monitoring unit whether the CAN transceiver is either in a transmitting mode in which the control unit controls the signal generating unit to generate the CAN signal, or in a non-transmitting mode; and Executing, using the monitoring unit and depending on the mode of the CAN transceiver detected by the monitoring unit, either a first process for detecting an error on the CAN signal lines or a second process for detecting an error on the transceiver or the CAN signal lines, the first process and the second process being different.

In accordance with a third aspect of the present disclosure, a computer program is provided, comprising executable instructions which, when executed by a processing unit, cause the processing unit being configured to carry out the method of the second aspect and/or one or more embodiments thereof.

DESCRIPTION OF DRAWINGS

Embodiments of the present disclosure will be described in more detail with reference to the appended drawings, in which.

Each of FIGS. 4 to 7 depict a simplified flow chart.

DESCRIPTION OF EMBODIMENTS

Figure 1:
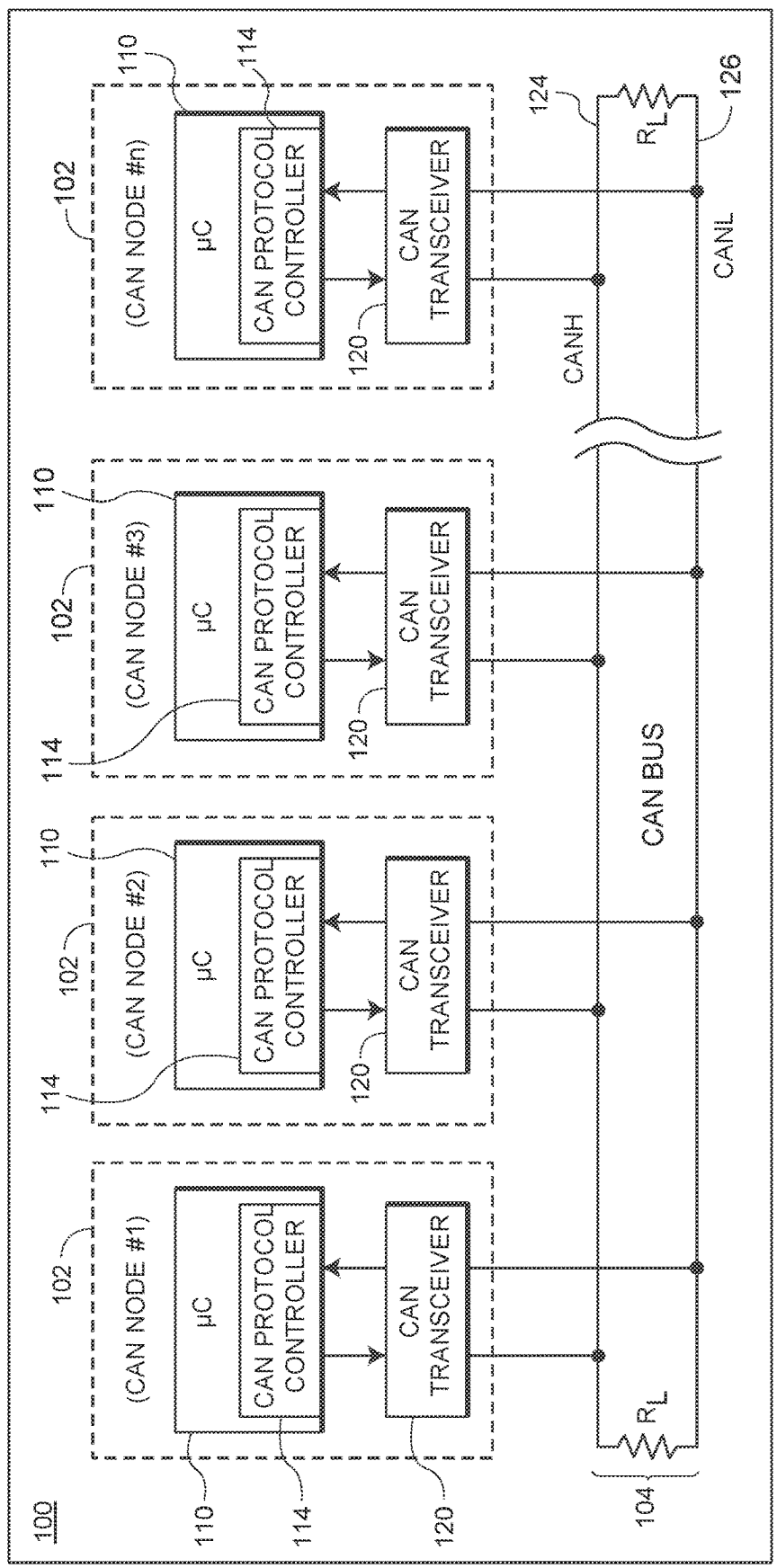
FIG. 1 shows simplified block diagram of a CAN network.

FIG. 1 depicts a CAN network 100 that includes multiple CAN nodes 102, also referred to as "ECUs," each connected to a CAN bus 104. In the embodiment of FIG. 1, each CAN node 102 includes a microcontroller 110 having an embedded CAN protocol controller 114 and a CAN transceiver 120. The CAN protocol controller 114 may be referred to as a controller or CAN controller. The CAN transceiver 120 may be referred to as a transceiver.

The microcontrollers 110 are typically connected to at least one device (not shown) such as a sensor, an actuator, or some other control device and are programmed to determine the meaning of received messages and to generate appropriate outgoing messages. The microcontrollers 110, which may also be referred to as host processors, hosts or digital signal processors (DSPs), are known in the field. In an embodiment, the host supports application software that interacts with the CAN protocol controller.

The CAN bus 104 carries analog differential signals and includes a first CAN signal line 124, which is also referred to as the CAN high (CANH) bus line 124, and a second CAN signal line 126, which is also referred to as the CAN low (CANL) bus line 126. The CAN bus is known in the field.

Figure 2:
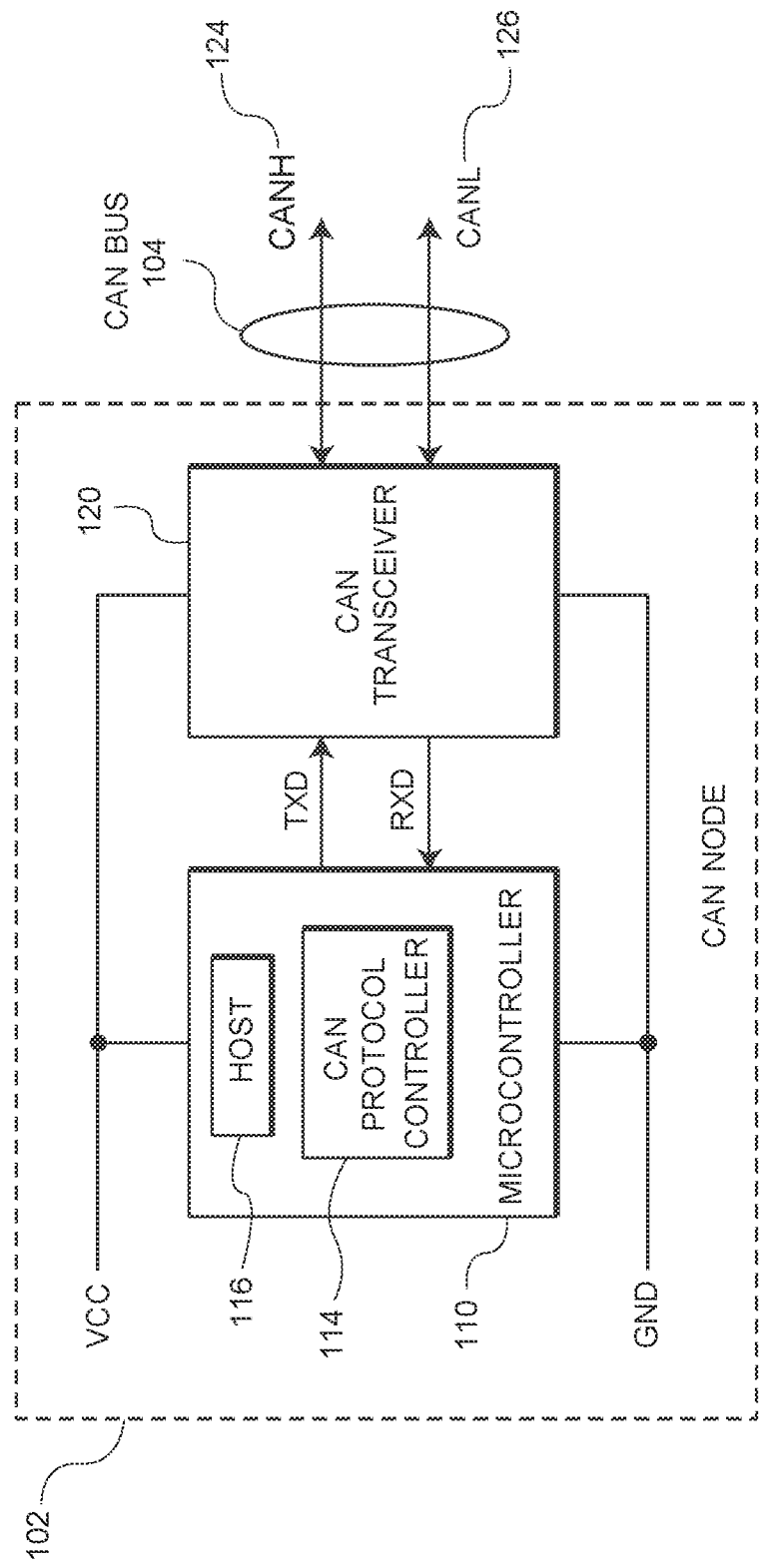
FIG. 2 shows a simplified block diagram of a CAN node.

FIG. 2 depicts an expanded view of one CAN node 102 from FIG. 1. In the expanded view of FIG. 2, the microcontroller 110 includes a host 116, which may be, for example, a software application that is stored in a memory of the microcontroller 110 and executed by processing circuits of the microcontroller 110. The microcontroller 110 and the CAN transceiver 120 of the CAN node 102 are connected between a first supply voltage, VCC, and ground, GND. For the purpose of the voltage supply, the CAN transceiver 120 may comprise a first voltage supply node, that can be connected to ground, and a second voltage supply node, that can be connected to the first supply voltage. The analogous nodes may be provided by the microcontroller 110 or may be even combined with the respective nodes of the microcontroller 110. As illustrated in FIG. 2, data communicated from CAN protocol controller 114 being implemented by the microcontroller 110 to the CAN transceiver 120 is identified as transmit data (TXD) and data communicated from the CAN transceiver 120 to the CAN protocol controller 114 being implemented by the microcontroller 110 is referred to as receive data (RXD). Throughout the description, TXD is carried on a TXD path and RXD is carried on an RXD path. Data is communicated to and from the CAN bus 104 via the CANH and CANL bus lines 124 and 126, respectively.

The CAN protocol controller 114 is preferably embedded within the microcontroller 110, but may also be implemented external to the microcontroller 110 (e.g., a separate IC device). The data link layer operations between the CAN protocol controller 114 and the CAN transceiver 120 is known in the field.

For example, in receive operations, the CAN protocol controller 114 receives from the transceiver 120 serial bits in a bit stream, referred to as a RXD stream, via the RXD path. The CAN protocol controller 114 stores the received bits until an entire message is available for fetching by the microcontroller 110. The CAN protocol controller 114 can also decode the CAN message according to the standardized frame format of the CAN protocol.

In transmit operations, the CAN protocol controller 114 receives a message from the microcontroller 110 and transmits the message as serial bits in a bit stream, referred to as a TXD stream, via the TXD path in the CAN frame format to the CAN transceiver 120.

The CAN transceiver 120 is located between the CAN controller 114 being implemented by the microcontrollers 110 and the CAN bus 104. The CAN transceiver 120 is configured to implement physical layer operations as known in the field.

For example, in receive operations, a CAN transceiver 120 converts analog differential signals from the CAN bus 104 to the RXD stream of serial bits that the CAN protocol controller 114 can interpret. The CAN transceiver 120 may also protects the CAN protocol controller 114 from extreme electrical conditions on the CAN bus 104, e.g., electrical surges.

In transmit operations, the CAN transceiver 120 converts serial bits of the TXD stream received via the TXD path from the CAN protocol controller 114 into analog differential signals that are sent on the CAN bus 104.

As noted above, the CAN protocol controller 114 can be configured to support the normal mode or the flexible data rate mode. As used herein, "CAN normal mode" (also referred to as "CLASSICAL CAN mode") as well as "CAN FD mode" refer to frames that are formatted according to the ISO 11898-1 standard.

Figure 3:
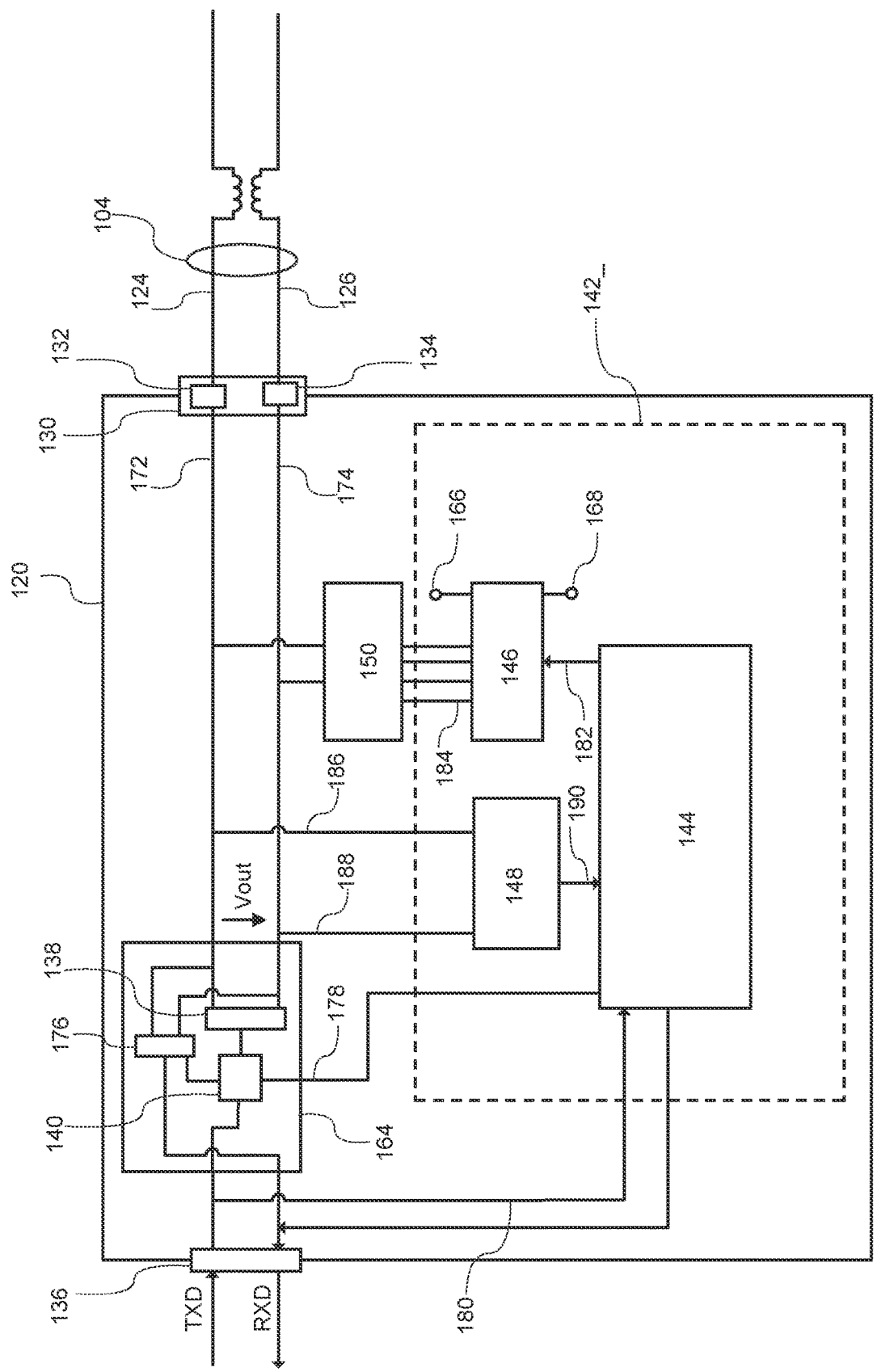
FIG. 3 simplified block diagram of a CAN transceiver.

FIG. 3 schematically illustrates an embodiment of the CAN transceiver 120 according to the present disclosure.

The transceiver 120 comprises a CAN BUS interface 130, the digital interface 136, a signal generation unit 138, a control unit 140, and a monitoring unit 142. The signal generation unit 138 and the control unit 140 may each be a part of a CAN module 164, wherein the CAN module 164 may be comprised by the transceiver 120.

The CAN BUS interface 130 has a first terminal 132 and a second terminal 134. The first terminal 132 is used for connection to a first CAN signal line 124. The second terminal 134 is used for connection to a second CAN signal line 126. The digital interface 136 of the transceiver 120 is designed to receive a digital signal, preferably via the TXD path. The digital signal may also be referred to as the TXD signal. The digital signal represents a sequence of data bits.

The signal generation unit 138 of the transceiver 120 is connected to the two terminals 132, 134. Further, the signal generation unit 138 is configured to generate a differential voltage signal Vout between the two terminals 132, 134. As can be taken from FIG. 3, a first internal signal line 172 extends from the signal generation unit 138 to the first terminal 132. A second internal signal line 174 extends from the signal generation unit 138 to the second terminal 134. These two internal signal lines 172, 174 enable the signal generation unit 138 to generate the differential voltage signal between the two terminals 132, 134.

The control unit 140 is configured to control the signal generation unit 138 based on a receiving digital signal such that a CAN signal in the form of a differential voltage signal representing the data bits of the receiving digital signal is generated at the CAN BUS interface 130. For example, if the digital signal received via the digital interface 136 comprises a sequence of dominant and recessive bits, the same sequence of bits can be represented by the CAN signal generated by the signal generation unit 138. In the CAN signal, a dominant bit "0" is represented, for example, by a differential voltage of 2 V between the two terminals 132, 134. For this purpose, the signal generation unit 138 may generate a voltage of 3.5 V at the first terminal 132 and a voltage of 1.5 V at the second terminal 134. A recessive bit "1" is preferably represented in the CAN signal by a differential voltage of 0 V between the two terminals 132, 134. For this purpose, the signal generation unit 138 may generate a voltage of 2 V at each of the two terminals 132, 134. Which differential voltage is generated by the signal generation unit 138 between the two terminals 132, 134 is controlled by the control unit 140.

The monitoring unit 142 of the transceiver 120 is also represented schematically in FIG. 3 by a box shown with dashed lines. The monitoring unit 142 is configured to detect whether the CAN transceiver 120 is in either a transmitting mode or a non-transmitting mode. In the transmitting mode, the control unit 140 controls the signal generation unit 138 to generate the CAN signal representing bits. In the non-transmitting mode, the signal generation unit 138 is preferably controlled by the control unit 140 not to generate the CAN signal representing bits. Thus, in the non-transmitting mode, preferably no CAN signal is generated by the signal generation unit 138.

In an example of the CAN transceiver 120, the digital signal interface 136 of the CAN transceiver 120 is connected to the monitoring unit 142 and preferably to the associated processing unit 144 via an internal signal line 180. Once the CAN transceiver 120 receives a digital signal via the signal interface 136, the signal generation unit 138 is controlled based on the received digital signal by the control unit 140 so that a CAN signal is generated at the CAN BUS interface 130 representing the data bits of the received digital signal. From this, it can be inferred that the CAN transceiver 120 changes to the transmitting mode upon receiving the digital signal via the signal interface 136 if the CAN transceiver was previously in the non-transmitting mode. If multiple digital signals are received in immediate succession via the signal interface 136, the CAN transceiver 120 may remain in the transmitting mode. Therefore, based on the at least one digital signal receivable via the digital signal interface 136, it can be determined whether the CAN transceiver 120 is in either the transmitting mode or the non-transmitting mode. The monitoring unit is connected to the digital signal interface 136 of the CAN transceiver 120 via the internal signal lines 180 so that the respective data is available to the monitoring unit 142 to determine whether the CAN transceiver 120 is in either the transmitting mode or the non-transmitting mode. In an example, the monitoring unit 142 is configured to detect the transmitting mode of the CAN transceiver 120 if the monitoring unit 142 receives a digital signal via the connected digital signal interface 136. Further, the monitoring unit 142 may be configured to detect the non-transmitting mode of the CAN transceiver 120 if a reception of one or more digital signals via the connected digital signal interface 136 has been completed and preferably a predetermined time has elapsed after completion of the last received digital signal without a new reception of a digital signal.

In an example of the CAN transceiver 120, it is noted that the monitoring unit 142 may be coupled to the control unit 140 via another internal signal lines 178, such that the monitoring unit 142 may detect via the signal lines 178 whether the control unit 140 is controlling the signal generation unit 138 to generate the CAN signal. For example, the control unit 140 may be configured to generate and send a status signal to the monitoring unit 142 via the signal lines 178, wherein the status signal represents whether or not the control unit 140 is controlling the signal generation unit 138 to generate the CAN signal. Thus, the status signal may indirectly indicate whether the CAN transceiver 120 is in either the transmitting mode or the non-transmitting mode.

In an example of the CAN transceiver 120, which can also be taken from FIG. 3, it is preferred that the transceiver 120 comprises a sensor unit 148. The sensor unit 148 may be connected to the two internal signal lines 172, 174 extending from the signal generation unit 138 to the two terminals 132, 134. The sensor unit 148 can thus be used to detect whether a CAN bus signal is being generated at the two terminals 132, 134 or at the CAN bus interface 130. If a CAN bus signal is generated by the signal generation unit 138, the CAN transceiver 120 is in transmitting mode. If, on the other hand, the sensor unit 148 detects that no CAN bus signal is generated by the signal generation unit 138, it can be concluded that the CAN transceiver 120 is in non-transmitting mode. Thus, a sensor signal of the sensor unit 148 which is received by the processing unit 144 via another internal signal line 190 may at least indirectly indicate whether the CAN transceiver 120 is in either the transmitting mode or the non-transmitting mode. Thus, the monitoring unit 142 may be configured to detect based on the sensor signal whether the CAN transceiver 120 is in either the transmitting mode or the non-transmitting mode.

Thus, there are several examples of configuring the monitoring unit 142 and the CAN transceiver 120 to detect whether the CAN transceiver 120 is in either the transmitting mode or the non-transmitting mode. However, it is of particular advantage to detect transmitting mode or non-transmitting mode based on the digital signal receivable via the digital signal interface 136, since the digital signal is robust to electromagnetic interference that may occur at the CAN bus 104 and thus at the CAN BUS interface 130 and the internal signal lines 172, 174 in the practical environment.

Detecting errors in the form of electrical shorts or broken lines in the transceiver 120 as well as on the two CAN signal lines 124, 126 has proven to be a challenge during investigations when the errors are to be detected by the transceiver 120. Preferably, if the transceiver is in a transmitting mode, changes in an electrical impedance between the two terminals 132, 134 are generally to be avoided to prevent additional errors. On the other hand, if the CAN transceiver 120 is in the non-transmitting mode, a change in an electrical impedance between the terminals 132, 134 may be possible without any resulting further errors.

Therefore, prior to the underlaying principles explained previously, it is provided that the monitoring unit 142 of the CAN transceiver 120 is configured to execute either a first process for detecting an error on the CAN signal lines or a second process for detecting an error in the CAN transceiver 120 or on the CAN signal lines 124, 126 depending on the mode of the CAN transceiver 120 detected by the monitoring unit 142, i.e., either the transmitting mode or the non-transmitting mode. In this regard, the first process and the second process are different. For example, the monitoring unit 142 may be configured to execute the first process for error detection in the non-transmitting mode and the second process for error detection in the transmitting mode. Thus, the monitoring unit may be configured to execute only one of the two processes, that is, either the first process while the CAN transceiver 120 is in the non-transmitting mode or the second process while the CAN transceiver 120 is in the transmitting mode.

The second process may be configured such that the second process is executed at least in part by the monitoring unit 142 while and/or only if the CAN transceiver 120 is generating a CAN signal between the terminals 132, 134. In contrast, the CAN transceiver may be configured such that the second process may be executed by the monitoring unit 142 while and/or only if no CAN signal is being generated by the CAN transceiver 120 between the terminals 132, 134.

By adapting the monitoring unit 142 to execute two different processes, namely the first process and the second process, it is possible to detect different errors in the form of electrical short circuits and broken lines both in the CAN transceiver 120 and on the CAN signal lines 124, 126 precisely and at the same time with a very small influence on the operating behavior of the CAN transceiver 120.

Figure 4:
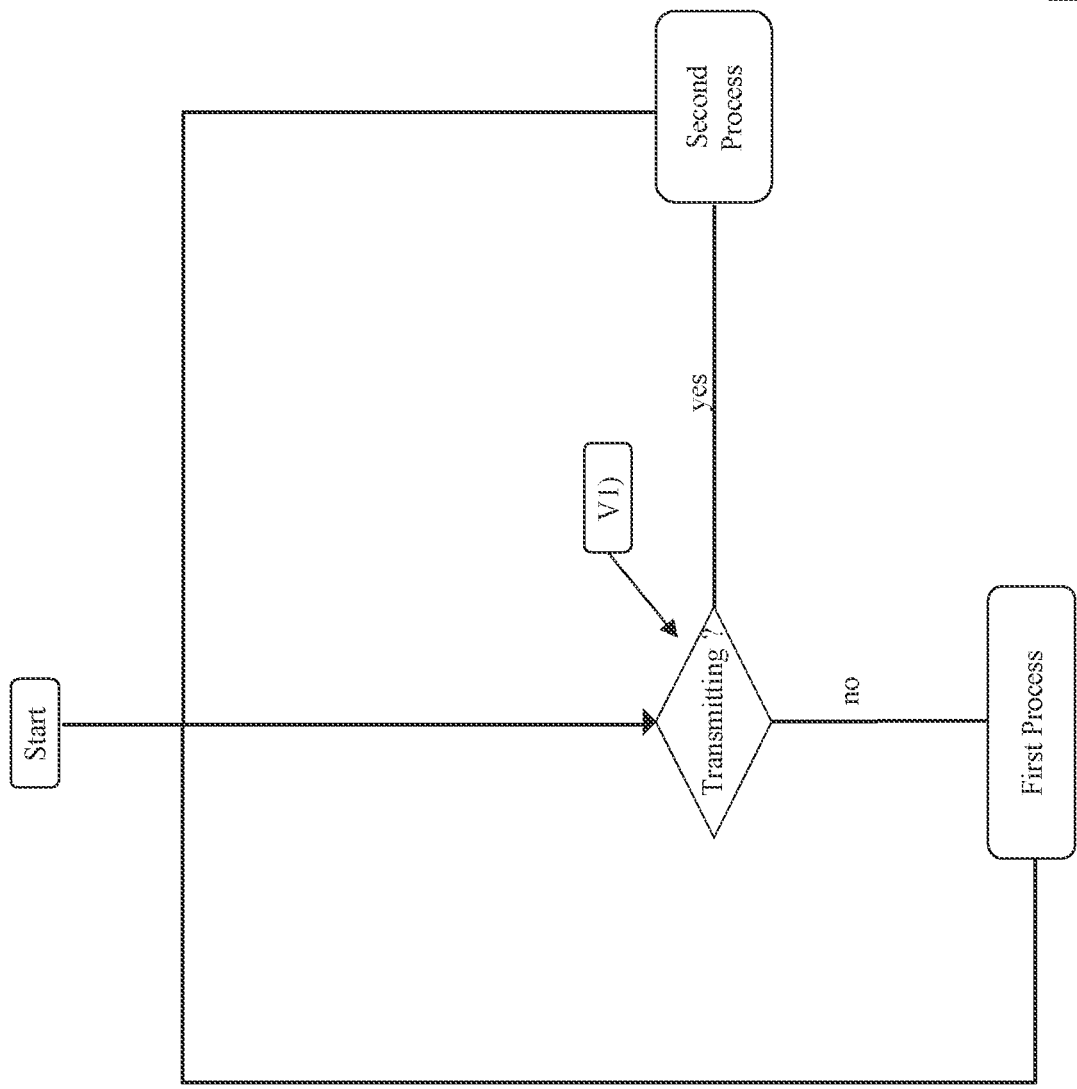

FIG. 4 schematically illustrates an example of a flowchart that may be executed by the monitoring unit 142. In a step V1), the monitoring unit 142 may be configured to detect whether the CAN transceiver 120 is in either the transmitting mode or the non-transmitting mode.

If a CAN signal is generated by the CAN transceiver 120 at the terminals 132, 134 of the CAN BUS interface 130 based on the received digital signal, the monitoring unit 142 detects that the CAN transceiver 120 is in transmitting mode. In this case, the monitoring unit 142 executes the second process for error detection. On the other hand, if no CAN signal is generated by the CAN transceiver at the terminals 132, 134 of the CAN BUS interface 130, the monitoring unit 142 is configured to detect that the CAN transceiver 120 is in the non-transmitting mode. In this case, the monitoring unit 142 executes the first process for error detection. The monitoring unit 142 may be configured to recheck whether the CAN transceiver 120 is in either the transmitting mode or the non-transmitting mode after completion of the first process or after completion of the second process, respectively. Subsequently, either the first process or the second process is executed by the monitoring unit 142. Thus, the monitoring unit 142 may repeatedly execute the steps of the flowchart shown schematically in FIG. 4.

A CAN transceiver 120 may be adapted to change from a working mode to a sleep mode, or vice versa. The working mode may also be referred to as the normal mode. In the sleep mode, the energy consumption of the CAN transceiver 120 may be reduced compared to the energy consumption in the work mode. In practice, the CAN transceiver 120 often enters the sleep mode if the CAN transceiver 120 is not used or has not been used for at least a predetermined time. In order to prevent the energy consumption from increasing during the sleep mode of the CAN transceiver 120, it may be provided that the error detection through the monitoring unit 142 of the CAN transceiver 120 is performed exclusively in the working mode of the CAN transceiver 120.

Figure 5:
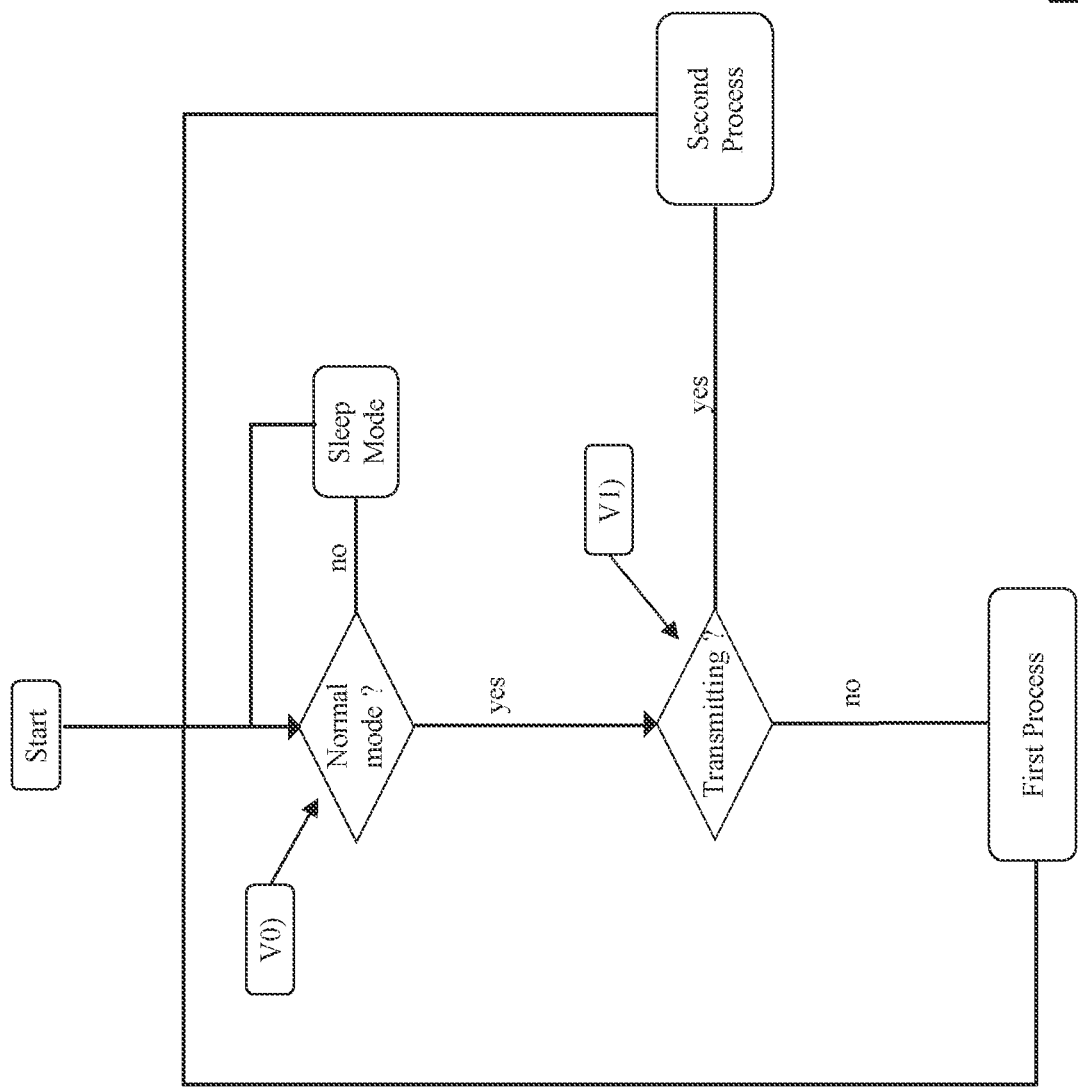

FIG. 5 schematically illustrates an example of a flow chart that can be executed by the monitoring unit 142. Regarding step V1), the first process and the second process, reference is made to the preceding explanations of the flow chart from FIG. 4 in an analogous manner. Compared with the flow chart shown in FIG. 4, the flow chart shown in FIG. 5 also comprises step V0). According to step V0, the monitoring unit 142 may be configured to detect whether the CAN transceiver 120 is either in the working mode (which is also referred to as normal mode) or in the sleep mode. Only if it is detected by the monitoring unit 142 that the CAN transceiver 120 is in the working mode, the subsequent step V1) is executed by the monitoring unit 142. Depending on the result from step V1), either the first process or the second process is executed by the monitoring unit 142. Subsequently, step V0) is executed again by the monitoring unit 142. In this way, it is ensured that a repeated error detection can be performed by of the monitoring unit 142, provided that the monitoring unit 142 is in the operating mode.

In an example, the CAN transceiver 120 may be configured to change from the working mode, in which the CAN transceiver 120 is ready to transmit signals, in particular CAN signals, to the sleep mode, in which the CAN transceiver 120 is not ready to transmit signals, in particular not ready to transmit CAN signals. Nevertheless, in an example, the CAN transceiver 120 may be ready to receive signals, in particular an TXD signal, in the sleep mode. Further, the CAN transceiver 120 may be configured to change from the sleep mode to the work mode. The monitoring unit 142 may be configured such that the first process and the second process may be executed by the monitoring unit 142 exclusively in the working mode. The monitoring unit 142 may further be configured such that neither of the first and second process can be executed in the sleep mode. As a result, power can be saved while the CAN transceiver 120 is in sleep mode.

In an example, the monitoring unit 142 may comprise a processing unit 144. The processing unit 144 may comprise a processor for executing process steps and a memory unit for storing data. In the example of the CAN transceiver 120 as schematically shown in FIG. 3, the monitoring unit 142 comprises a processing unit 144 coupled to the control unit 140 of the CAN controller 120 via the internal signal lines 178. Although the processing unit 144 and the control unit 140 are shown schematically as separate blocks in FIG. 3, the processing unit 144 and the control unit 140 may be fully or partially integral. Preferably, it is possible for the processing unit 144 and the control unit 140 to be formed together. It is noted, however, that it is also possible for the processing unit 144 and the control unit 140 to be formed separately from each other and to be coupled to each other via the internal signal lines 178.

Depending on the mode (either transmitting mode or non-transmitting mode) of the CAN transceiver 120 detected by the monitoring unit 142, either the first process for error detection or the second process for error detection may be executed by the monitoring unit 142. To execute the first or second process, the monitoring unit 142 uses the associated processing unit 144, at least for some process steps of the respective process. Instructions, flowcharts and/or algorithms may be stored in the form of data by the memory unit of the processing unit 144. Thus, data may be stored by the memory unit that is used by the processing unit 144 to execute or control the sub-steps of the respective process.

In an example of the CAN transceiver 120, the monitoring unit 142 comprises a control circuit 146. In FIG. 3, the control circuit 146 is shown schematically as a block. The processing unit 144 of the monitoring unit 142 is connected to the control circuit 146 via an internal signal line 182, so that the control circuit 146 is controllable by the processing unit 144 via control signals to be sent via the internal signal line 182. Preferably, the control circuit 146 is also connected to a first voltage supply node 168 and a second voltage supply node 166. The first and second voltage supply nodes 166, 168 may also be or connected to voltage supply nodes of the CAN transceiver 120. For example, the first voltage supply node 168 may be configured to be supplied with a positive voltage potential, such as 12 V. The second voltage supply node 166) may be configured to be supplied with a ground potential, for example 0 V.

In an example of the CAN transceiver 120, the CAN transceiver 120 comprises an impedance unit 150 that comprises at least two different impedances. At least one impedance of the impedance unit 150 is connected to the first internal signal line 172 extending from the signal generation unit 138 to the first terminal 132 of the CAN BUS interface 130. Also, at least one other impedance of the impedance unit 150 is connected to the second internal signal line 174 that extends from the signal generation unit 138 to the second terminal 134 of the CAN BUS interface 130. The impedance unit 150 and the control circuit 146 are interconnected via further internal signal lines 184. The control circuit 146 comprises a plurality of switches, preferably semiconductor switches, which are controllable by the processing unit 144 via the internal signal line 182. The internal signal line 182 may represent a plurality of signal lines. For each impedance of the impedance unit 150, a switchable connection to either the first voltage supply node 168 or the second voltage supply node 166 is established via a respective associated switch of the control circuit 146. By controlling the control circuit 146 by the processing unit 144, it is therefore controllable that, for example, the first internal signal lines 172 are electrically coupled to (if the switch is closed) or electrically decoupled from (to if the switch is open) the respective first or second voltage supply node 168, 166 via an impedance of the impedance unit 150. If the switch is closed, the respective connection and the connected impedance is enabled and if the switch is open, the respective connection and impedance is disabled.

In an example, the CAN transceiver 120 comprises the monitoring unit 142, which comprises the control circuit 146 controllable by the processing unit 144. Further, the CAN transceiver 120 may comprise a first impedance. The first impedance may form a part of the impedance unit 150. The first impedance of the CAN transceiver 120 may be enabled or disabled between the first terminal 130 and the first power supply node 168 by the monitoring unit 142 via the control circuit 146. In the enabled case, the first impedance is applied between the first node 132 and the first voltage supply node 168. In the disabled case, the first impedance is not applied between the first node 132 and the first voltage supply node 168. Further, the CAN transceiver 120 may comprise a second impedance. The second impedance may form a part of the impedance unit 150. The second impedance of the CAN transceiver 120 may be enabled or disabled between the second terminal 134 and the second voltage supply node 166 by the monitoring unit 142 via the control unit 146. In the enabled case, the second impedance is applied between the second terminal 134 and the second voltage supply node 166. In the disabled case, the second impedance is not applied between the second terminal 132 and the second voltage supply node 166.

The control circuit 146 and the first and second impedances may be used in the first process to detect errors on the CAN signal lines 124, 126 using the monitoring unit 142. The first impedance and the second impedance may each comprise or be formed from an electrical resistor, for example each having a value of 10 K-ohms.

Figure 6:
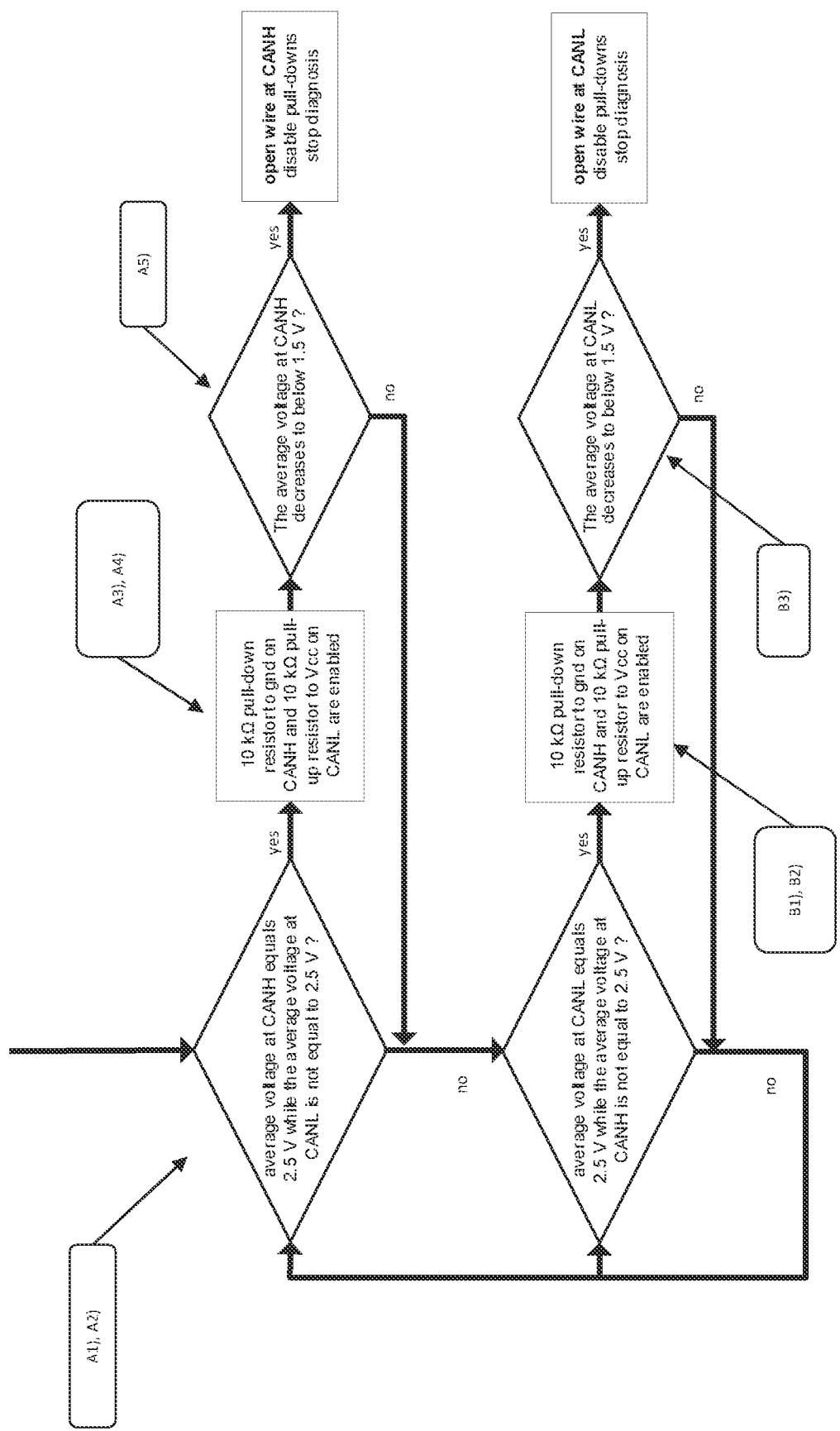

FIG. 6 shows an example of a flow chart for the first process. If in the following process steps are explained with reference sign, such as A1), A2) or B1), B2) etc., no mandatory sequence is to be derived from the use of the respective reference signs. Rather, the reference signs used in the flow chart serve solely to improve understanding of the associated drawings.

In an example, the monitoring unit 142 is configured to perform the first process comprising steps A1) to A5).

In a first step A1) of the first process according to the example, a detecting of a first voltage at the first terminal 130 is performed using the sensor unit 148 of the monitoring unit 142. In a second step A2) of the first process according to the example, a detecting of a second voltage at the second terminal 134 is performed using the sensor unit 148.

The sensor unit 148 may be configured to detect an electrical voltage. Furthermore, the sensor unit 148 is connected to the first terminal 132 via a further internal signal line 186 and preferably via the internal signal line 172. Furthermore, the sensor unit 148 may be connected to the second terminal 134 via a further internal signal lines 188 and preferably via the internal signal lines 174. The sensor unit 148 may be connected to the processing unit 144 via a further internal signal line 190. The sensor unit 148 may be configured to send a sensor signal to the processing unit 144 via the internal signal lines 190, the sensor signal representing the first voltage detected in step A1) and/or the second voltage detected in step A2). During execution of the first step A1) and the second step A2), the impedances of the impedance unit 150 are preferably disabled.

Preferably, the monitoring unit 142, and more preferably the associated processing unit 144, is configured to determine whether the first voltage from step A1) corresponds to a first predetermined reference voltage of preferably 2.5 V. Furthermore, the monitoring unit 142, and more preferably the associated processing unit 144, is preferably configured to determine whether the second voltage from step A2) deviates from the first reference voltage.

The monitoring unit is preferably configured to further perform steps A3) to A5) in the first process if the first voltage from step A1) corresponds to the first reference voltage and the second voltage from step A2) deviates from the first voltage.

In the step A3), an activation of the first and second impedances is performed by controlling the control circuit 146 through the processing unit 144. In the step A4), another detection of the first voltage is performed by the sensor unit 148 after and the activation of the first and second impedances. Thus, step A4) by may performed while the first and second impedances are activated.

It is noted that the first process is preferably executed by the monitoring unit 142 only while the CAN transceiver 120 is in non-transmitting mode. The first process is therefore suitable for detecting an interruption in the first signal lines 124 or for detecting an interruption in the second signal lines 126, at least while the two signal lines 124, 126 are connected to the CAN signal interface 130. The interruption may also be referred to as an open wire.

If the first voltage detected in step A4) drops to a value less than the first reference voltage, of preferably 1.5 V, after activating the first and second impedances (in step A3)), this is an indication of an interruption in the first signal lines 124 coupled to the first terminal 132 of the CAN BUS interface 130. The monitoring unit 142 is preferably configured to determine whether the first voltage detected in step A4) is less than the first reference voltage. Further, the monitoring unit 142 is configured to perform step A5). In step A5), a determination of an error, referred to in this case as a first error, is performed using the processing unit 144 if the first voltage detected in step A4) is smaller than the first reference voltage. The first error represents an interruption at the first CAN signal line 124. The interruption is also referred to as an open wire. In general, an error may also be referred to as a failure, or vice versa. Thus, the terms "error" and "failure" may be used in this disclosure as synonyms.

The first process executable by the monitoring unit 142 thus offers the advantage that by executing steps A1) to A5), a (first) error on the signal line 124 can be detected, although no CAN signal is to be transmitted via the CAN signal interface 130 to detect the error. For the detection of the first error, it is therefore not necessary to transmit data via the CAN interface 130 beforehand or to wait for a possible feedback from a remote device of the CAN network.

In an example, the monitoring unit 142 is configured to execute the first process comprising steps A1) to A2) and steps B1) to B3). The preceding explanations of steps A1) and A2) are referred to in an analogous manner.

Preferably, the monitoring unit 142, and more preferably the associated processing unit 144 is configured to determine whether the second voltage from step A2) corresponds to the first predetermined reference voltage, which is preferably 2.5 V. Furthermore, the monitoring unit 142, preferably the associated processing unit 144 is preferably configured to determine whether the first voltage from step A1) deviates from the first reference voltage. The monitoring unit 142 is preferably configured to further perform steps B1) to B3) in the first process if the second voltage from step A2) corresponds to the first reference voltage and if the first voltage from step A1) deviates from the first reference voltage. In the step B1), the first and second impedances are activated by controlling the control circuit 146 using the processing unit 144. In the step B2), the second voltage is again detected using the sensor unit 148 after the first and second impedances are activated. Thus, step B2) by may performed while the first and second impedances are activated.

If the second voltage detected in step B2) drops to a value less than the first reference voltage after the first and second impedances are activated (in step B1)), this is an indication of an interruption on the second signal line 126 coupled to the second terminal 134 of the CAN BUS interface 130. Preferably, the monitoring unit 142 is configured to determine whether the second voltage detected in step B2) is less than the first reference voltage. Further, the monitoring unit 142 is configured to perform step B3). In step B3), a determination of an error, referred to in this case as a second error, is performed using the processing unit 144 if the second voltage detected in step B2) is smaller than the first reference voltage. The second error represents an interruption at the second CAN signal line 126. The interruption also being referred to as an open wire.

The first process executable by the monitoring unit 142 thus offers the advantage that by executing steps A1) to A2) and steps B1) to B3), a (second) error on the signal line 126 can be detected, although no CAN signal is to be transmitted via the CAN signal interface 130 to detect the error. For the detection of the second error, it is therefore not necessary to transmit data via the CAN interface 130 beforehand or to wait for a possible feedback from a remote device of the CAN network.

It is again noted that the monitoring unit 142 is preferably configured such that the monitoring unit 142 executes the first process for error detection exclusively in the non-transmitting mode. Further, the monitoring unit 142 is preferably configured to execute the second process for error detection exclusively in the transmitting mode of the CAN transceiver 120.

While the CAN transceiver 120 is in transmitting mode, it has been found during investigations to be advantageous for error detection to take into account the currents flowing through the two terminals 132, 134 of the CAN BUS interface 130 and the voltages present at the two terminals 132, 134 for representing at least one dominant bit. It has also been found during investigations to be advantageous that a differential voltage representing a single dominant bit is often present for less than 200 ns between the two terminals 132, 134, making robust error detection difficult. In addition, a time delay with respect to presence of the differential voltage may occur, which also complicates a robust error detection. Against the background of the investigations, it is proposed to consider for the second process step of detecting a sub-sequence consisting of a plurality of successive dominant bits represented a differential voltage signal between the two terminals 132, 134 for at least a predefined time, such that the corresponding duration of application of the differential voltage offers a robust error detection while the CAN transceiver 120 is in the transmitting mode.

Figure 7:
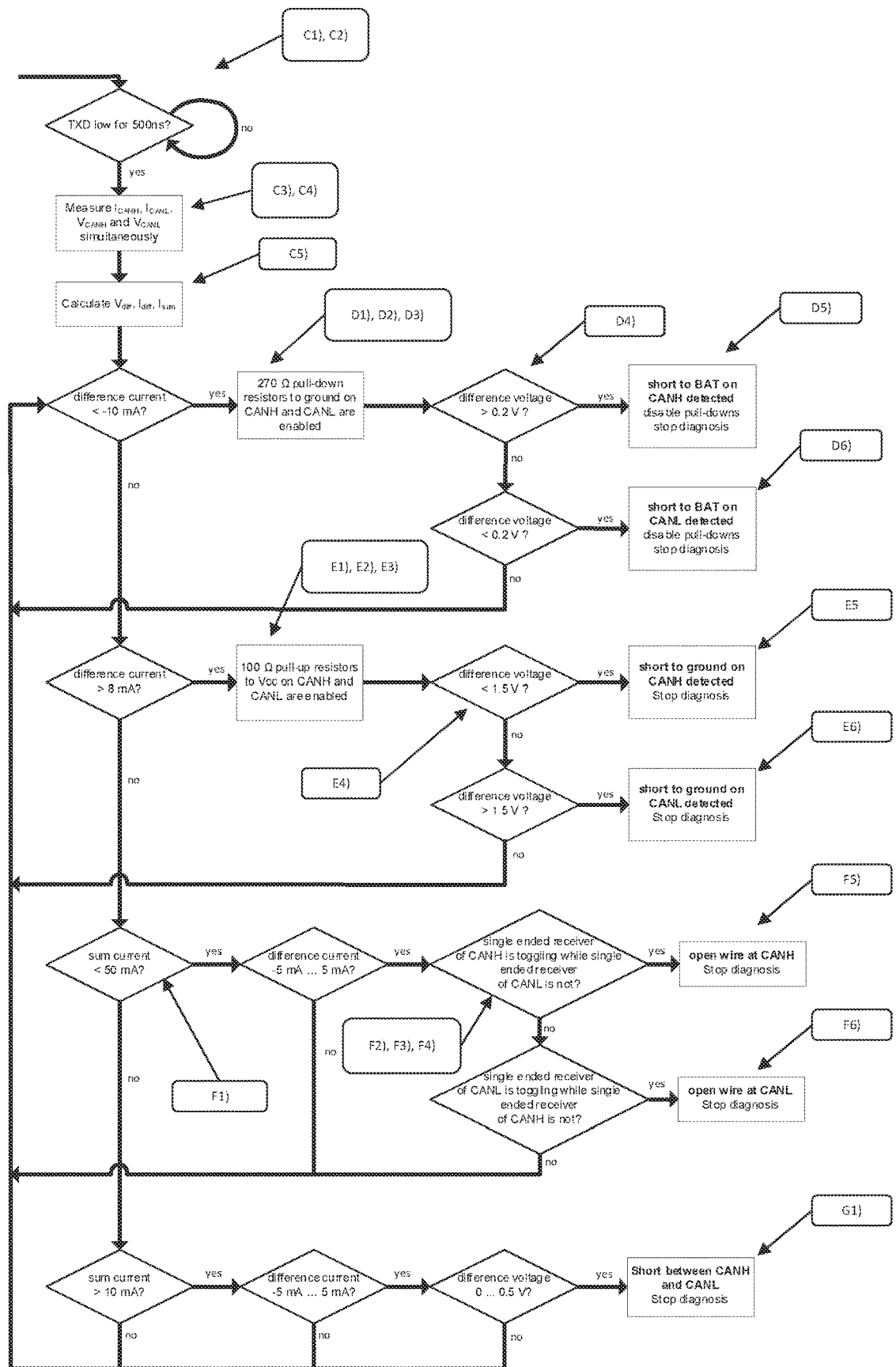

In an example, the monitoring unit 142 of the CAN transceiver 120 is configured to perform steps C1) to C5) in the second process. FIG. 7 schematically illustrates a flowchart of an example of the second process.

With reference to FIG. 3, it has been previously explained that the digital input signal interface 136 may be connected via the signal line 180 to the monitoring unit 142, and more preferably to the associated processing unit 144, so that a digital signal received via the digital signal interface 136 is also routed to the monitoring unit 142, and preferably also to the associated processing unit 144.

In the step C1) executable by the monitoring unit 142, a sequential detection of a bit duration (time period) of each bit of the bit sequence represented by the received digital input signal is performed. In an example, the processing unit 144 of the monitoring unit 142 may be configured to execute step C1).

In the step C2) executable by the monitoring unit 142, a detection of a sub-sequence of at least one bit of the bit sequence (represented by the received digital input signal), preferably at least two, three, four or five bits of the bit sequence, wherein each bit of the sub-sequence is a dominant bit and wherein the total duration (time period) of the sub-sequence is at least a predetermined reference time, preferably of at least 500 ns. The total duration corresponds to the sum of the duration of each dominant bit of the sub-sequence.

In step C1), the associated bit duration is determined for each bit, so that the duration of the respective bit of the bit sequence is known to the monitoring unit. Furthermore, it is preferably provided that the monitoring unit 142, and preferably the associated processing unit 144, is configured to detect dominant bits in the bit sequence. Based on step C1), the monitoring unit 142 also has the information about the duration of each of the dominant bits of the bit sequence. By step C2), a sub-sequence is detected from the bit sequence by the monitoring unit 142, and more preferably by the associated processing unit 144, wherein the sub-sequence comprises at least one dominant bit, but preferably at least two consecutive dominant bits, at least three consecutive dominant bits, at least four consecutive dominant bits, or at least five consecutive dominant bits of the bit sequence. Preferably, if multiple consecutive dominant bits form the sub-sequence, it is expected that the sub-sequence will be represented by a non-zero differential voltage signal between the two terminals 132, 134 with a corresponding total duration. This differential voltage signal, present for the total duration, may present for a sufficient time for error detection while the CAN transceiver 120 is in the transmitting mode.

It is to be noted, that neither of the steps C1) and C2) negatively influences the operation of the CAN module 164.

Further, the monitoring unit 142 is configured to execute steps C3) to C4) in a period of time while the dominant bits of the sub-sequence are represented by a corresponding CAN signal between the terminals 132, 134.

As previously explained, the monitoring unit 142 preferably comprises a sensor unit 148. The sensor unit 148 may be coupled to the first internal signal line 172 to detect a first current through the first signal lines 172. This current also corresponds to the current flowing through the first terminal 132. Thus, the sensor unit 148 may be configured and arranged to detect a first current through the first terminal 132. Further, the sensor unit 148 may be coupled to the second internal signal line 174 to detect a second current through the second signal lines 174. This current also corresponds to the current flowing through the second terminal 134. Thus, the sensor unit 148 may be configured and arranged to detect a second current through the second terminal 134.

In the step C3) executable by the monitoring unit 142, a detection of the first current flowing through the first terminal 132 is performed using the sensor unit 148. In the step C4) executable by the monitoring unit 142, a detection of the second current flowing through the second terminal 134 is performed using the sensor unit 148. Thus, both currents are detected by the sensor unit 148 of the monitoring unit 142 in a period of time while the at least one dominant bit, preferably while a plurality of dominant bits, of the sub-sequence are represented by a corresponding CAN signal between the terminals 132, 134.

The difference current between the two currents, which results if the second current is subtracted from the first current, can already be used to perform a rough estimation of the potential errors. For example, if the difference current is less than a predetermined first reference current, this may indicate that one of the two CAN signal lines 124, 126 has a short to the second voltage supply node 166 or a battery voltage. However, if the difference current is greater than a predetermined second reference current, for example, this may indicate that one of the two signal lines 124, 126 has a short to the first voltage supply node 168 or to a ground potential.

Therefore, the monitoring unit 142, preferably the associated processing unit 144 is configured to perform step C5) of the second process. In step C5), a determination of the difference current is performed using the processing unit 144, wherein the difference current represents the difference between the first current and the second current. In order to gain more precise insights, further steps in the second process are still helpful.

In an example of the CAN transceiver 120, the resistor unit 150 comprises a third electrical impedance and a fourth electrical impedance. The third and fourth electrical impedances may each have a resistance with a value of 270 ohms. Preferably, the third impedance is connected to the first internal signal lines 172 and thus to the first terminal 132. Preferably, the fourth impedance is connected to the second internal signal lines 174 and thus to the second terminal 134. The control circuit 146 of the monitoring unit 142 may be connected to the third impedance via the internal signal lines 184, such that the third electrical impedance may be electrically coupled to or electrically decoupled from the first power supply node 168 by control circuit 150. Further, the control circuit 146 may be connected to the fourth impedance via the internal signal lines 184, such that the fourth impedance may be electrically coupled to or electrically decoupled from the first voltage supply node 168 by the control circuit 150.

In an example, the CAN transceiver 120 is configured such that the third electrical impedance of the CAN transceiver 120 between the first terminal 132 and the first power supply node 168 of the CAN transceiver 120 can be enabled or disabled via the control circuit 146 being preferably under control of the processing unit 146 of the monitoring unit 150.

In an example, the CAN transceiver 120 is configured such that the fourth electrical impedance of the CAN transceiver 120 between the second terminal 134 and the first voltage supply node 168 of the CAN transceiver 120 can be enabled or disabled via the control circuit 146 being preferably under control of the processing unit 146 of the monitoring unit 150.

In an example, the monitoring unit 142, preferably using the sensor unit 148 and the processing unit 144, is configured to determine whether the difference current from step C5) of the second process is less than a first predetermined reference current. The first predetermined reference current is preferably negative, more preferably −10 mA or less.

In an example, the monitoring unit 142 is configured to perform steps D1) to D5) in the second process if the difference current from step C5) is less than the first predetermined reference current. Thus, the steps D1) to D5) may be performed after step C5).

In the step D1), the third and fourth impedances are activated by controlling the control circuit 146 through the processing unit 144, resulting in the third electrical impedance being electrically connected between the first terminal 132 and the first voltage supply node 168, and the fourth impedance being electrically connected between the second terminal 134 and the first voltage supply node 168.

In step D2), a third voltage is detected at the first terminal 132 by the sensor unit 148. Reference is made in an analogous manner to the previous explanations regarding the detection of the voltage at the first internal signal lines 172 and the resulting voltage detection at the first terminal 132. Step D2) is performed by the sensor unit 148 while the third and fourth impedances are enabled at step D1).

In step D3), a fourth voltage is detected at the second terminal 134 by the sensor unit 148. In this context, too, reference is made to the previous explanations regarding the detection of the voltage at the second internal signal lines 174 and the resulting voltage detection at the second terminal 134 in an analogous manner. The step D3) is performed by the sensor unit 148 while the third and fourth impedances are enabled at step D1).

In the step D4), a first difference voltage is determined using the processing unit 144 of the monitoring unit 142. The first difference voltage represents the difference between the third voltage and the fourth voltage. To determine the first difference voltage, the processing unit 144 may be configured to subtract the fourth voltage from the third voltage.

The monitoring unit 142, and preferably the associated processing unit 144 is configured to determine whether the differential voltage determined in step D4) is at least a second reference voltage. Preferably, the second reference voltage has the value of 0.2 V.

Furthermore, the monitoring unit 142, and preferably the associated processing unit 144 is configured to perform step D5). In step D5), a determination of an error, referred to in this case as a third error, is performed using the processing unit 144 if the differential voltage determined in step D4) is at least the second reference voltage. The third error represents a short between the first terminal 132 and the second power supply node 166 of the CAN transceiver 120 or a battery voltage.

In an example, the monitoring unit 142, and preferably the associated processing unit 144 is configured to determine whether the differential voltage determined in step D4) is less than the second reference voltage.

Furthermore, the monitoring unit 142, and preferably the associated processing unit 144 may be configured to perform step D6) in the second process if the differential voltage determined in step D4) is less than the second reference voltage. In step D6), a determination of an error, referred to as a fourth error, is performed using the processing unit 144 if the differential voltage determined in step D4) is less than the second reference voltage. The fourth error represents an electrical short between the second terminal 134 and the second power supply node 166 of the CAN transceiver 120.

It can be concluded from the previous explanations that steps C1) to C5) are carried out initially in the second process in order to create the conditions for carrying out further steps in the second process. Steps C1) to C5) have the advantage that no negative interference occurs in the signal transmission by the CAN BUS interface 130. Only if the result of step C5) also indicates the further requirement that the first differential current from step C5) is smaller than the first predetermined reference current then, for example, steps D1) to D5) are executed. A possibly occurring interference with the signal transmission by the CAN BUS interface 130 while executing steps D1) to D5) is acceptable, since the previously mentioned further requirement is a potential indication that a short circuit could exist between one of the two CAN signal lines 124, 126 and the second voltage supply node or a battery voltage.

In an example of the CAN transceiver 120, the resistor unit 150 comprises a fifth electrical impedance and a sixth electrical impedance. The fifth and sixth electrical impedances may each have a resistance with a value of 100 ohms. Preferably, the fifth impedance is connected to the first internal signal lines 172 and thus to the first terminal 132. Preferably, the sixth impedance is connected to the second internal signal lines 174 and thus to the second terminal 134. The control circuit 146 of the monitoring unit 142 may be connected to the fifth impedance via the internal signal lines 184, such that the fifth electrical impedance may be electrically coupled to or electrically decoupled from the second power supply node 166 by control circuit 150. Further, the control circuit 146 may be connected to the sixth impedance via the internal signal lines 184, such that the sixth impedance may be electrically coupled to or electrically decoupled from the second voltage supply node 166 by the control circuit 150.

In an example, the CAN transceiver 120 is configured such that the fifth electrical impedance of the CAN transceiver 120 between the first terminal 132 and the second power supply node 166 of the CAN transceiver 120 can be enabled or disabled via the control circuit 146 being preferably under control of the processing unit 146 of the monitoring unit 150.

In an example, the CAN transceiver 120 is configured such that the sixth electrical impedance of the CAN transceiver 120 between the second terminal 134 and the second voltage supply node 166 of the CAN transceiver 120 can be enabled or disabled via the control circuit 146 being preferably under control of the processing unit 146 of the monitoring unit 150.

In an example, the monitoring unit 142, preferably using the sensor unit 148 and the processing unit 144, is configured to determine whether the difference current from step C5) of the second process is at least a second predetermined reference current. The second predetermined reference current is preferably positive, more preferably 8 mA or more.

In an example, the monitoring unit 142 is configured to perform steps E1) to E5) in the second process if the difference current from step C5) is at least the second predetermined reference current. Thus, the steps E1) to E5) may be performed after step C5) or after step D5).

In the step E1), the fifth and sixth impedances are activated by controlling the control circuit 146 through the processing unit 144, resulting in the fifth electrical impedance being electrically connected between the first terminal 132 and the second voltage supply node 166, and the sixth impedance being electrically connected between the second terminal 134 and the second voltage supply node 166.

In step D2), a fifth voltage is detected at the first terminal 132 by the sensor unit 148. Reference is made in an analogous manner to the previous explanations regarding the detection of a voltage at the first internal signal lines 172 and the resulting voltage detection at the first terminal 132. Step E2) is performed by the sensor unit 148 while the fifth and sixth impedances are enabled at step E1).

In step E3), a sixth voltage is detected at the second terminal 134 by the sensor unit 148. In this context, too, reference is made to the previous explanations regarding the detection of a voltage at the second internal signal lines 174 and the resulting voltage detection at the second terminal 134 in an analogous manner. The step E3) is performed by the sensor unit 148 while the fifth and sixth impedances are enabled at step E1).

In step E4), a second difference voltage is determined using the processing unit 144 of the monitoring unit 142. The second difference voltage represents the difference between the fifth voltage and the sixth voltage. To determine the second difference voltage, the processing unit 144 may be configured to subtract the sixth voltage from the fifth voltage.

The monitoring unit 142, and preferably the associated processing unit 144 is configured to determine whether the differential voltage determined in step E4) is at least a third reference voltage. Preferably, the third reference voltage has the value of 1.5 V.

Furthermore, the monitoring unit 142, and preferably the associated processing unit 144 may be configured to perform step E5). In step E5), a determination of an error, referred to in this case as a fifth error, is performed using the processing unit 144 if the differential voltage determined in step E4) is less than the third reference voltage. The third reference voltage being higher than the second reference voltage. The third error represents a short between the first terminal 132 and the first power supply node 168 of the CAN transceiver 120 or ground potential.

In an example, the monitoring unit 142, and preferably the associated processing unit 144 is configured to determine whether the differential voltage determined in step E4) is at least the third reference voltage.

Furthermore, the monitoring unit 142, and preferably the associated processing unit 144 may be configured to perform step E6) in the second process if the differential voltage determined in step E4) is at least the third reference voltage. In step E6), a determination of an error, referred to as a sixth error, is performed using the processing unit 144 if the differential voltage determined in step E4) is at least the third reference voltage. The sixth error represents an electrical short between the second terminal 134 and the first power supply node 168 of the CAN transceiver 120 or to ground potential.

It can be concluded from the previous explanations that steps C1) to C5) are carried out initially in the second process in order to create the conditions for carrying out further steps in the second process. Steps C1) to C5) have the advantage that no negative interference occurs in the signal transmission by the CAN BUS interface 130. Only if the result of step C5) also indicates the further requirement that the first differential current from step C5) is larger than the second predetermined reference current then, for example, steps E1) to E5) may be executed. A possibly occurring interference with the signal transmission by the CAN BUS interface 130 while executing steps E1) to E5) is acceptable, since the previously mentioned further requirement is a potential indication that a short circuit could exist between one of the two CAN signal lines 124, 126 and the first voltage supply node or ground potential.

As previously explained, in step C3) executable by the monitoring unit 142, a detection of the first electric current flowing through the first terminal 132 is performed using the sensor unit 148. In step C4) executable by the monitoring unit 142, a detection of the second electric current flowing through the second terminal 134 is performed using the sensor unit 148. Thus, both currents are detected by the sensor unit 148 of the monitoring unit 142 in a period of time while the at least one dominant bit, preferably the plurality of dominant bits, of the sub-sequence are represented by a corresponding CAN signal between the terminals 132, 134.

A sum current of both currents, which results if the first and second currents are added, can be used for a rough estimation of further potential errors. For example, if the sum current is smaller than a predetermined third reference current, this may indicate that one of the two CAN signal lines 124, 126 has an interruption. However, for example, if the sum current is greater than a predetermined fourth reference current, this may indicate that there is a short between the two signal lines 124, 126.

In order to gain more precise insights, further steps in the second process are still helpful.

In an example of the CAN transceiver 120, the monitoring unit 142 is configured to perform steps F1) through F5) in the second process. Thus, the monitoring unit 142 may be configured to perform both steps C1) through C5) explained previously and steps F1) through F5) in the second process.

In the step C1), a determination of the sum current is performed using the processing unit 144, wherein the sum current is the sum of the first current from step C3) and the second current from step C4).

In an example, the monitoring unit 142 is configured to determine whether the sum current is less than a third reference current. Preferably, the third reference current is 50 mA. Further, the monitoring unit 142 may be configured to determine whether the difference current from step C5) is greater than a fourth reference current and less than a fifth reference current. The fourth reference current is preferably negative, more preferably having a value of −5 mA. The fifth reference current is preferably larger than the fourth reference current. For example, the fifth current may have a value of 5 mA. In another example, the fifth reference current is greater than the fourth reference current, and the third reference current is greater than the fifth reference current.

In an example, the monitoring unit 142 is configured to perform steps F2) through F5) if the sum current from step F1) is less than the third reference current and further if the difference current from step C5) is greater than the fourth reference current and less than the fifth reference current.

In step F2), a first voltage signal is detected using the sensor unit 148 and the processing unit 144, the first voltage signal representing an electrical voltage at the first terminal 132 over at least a predetermined first time period. Preferably, the first time period is between 0.1 µs and 1 µs.

In step F3), a second voltage signal is detected using the sensor unit 148 and the processing unit 144, wherein the second voltage signal is an electrical voltage at the second terminal 134 over at least the first time period.

Preferably, none of the impedances of the impedance unit 150 is active during the execution of steps F2) and F3).

In step F4), an analyzing of a first waveform of the first voltage signal and of a second waveform of the second voltage signal is performed using the processing unit 144. The processing unit 144 may be configured to analyze the waveform of a voltage signal. As a result, the processing unit 144 may determine both the first waveform and the second waveform. The processing unit 144 may comprise a low-pass filter, particularly having a cut-off frequency of 300 kHz, used to analyze the voltage signal resulting in its waveform. Instead of the cutoff frequency of 300 kHz, another suitable cutoff frequency may be used.

In an example, the processing unit 144 is configured to determine whether the first waveform of the first voltage signal represents a toggling voltage. It is to be noted that a toggling voltage has a voltage amplitude of at least a fourth reference voltage, which is preferably 0.5 V. In an example, the processing unit 144 is configured to determine whether the second waveform of the second voltage signal represents a constant voltage.

In step F5), a determining of an error, referred to in this case as a seventh error, is performed using the processing unit 144 if the first waveform represents a toggling voltage having a voltage amplitude of at least the fourth reference voltage, and further if the second waveform represents a constant voltage. Preferably, the fourth reference voltage is 0.5 V. The seventh error represents an interruption of the first signal line 124. The interruption may also be referred to as an open wire.

Furthermore, the monitoring unit 142, and preferably the associated processing unit 144 may be configured to detect whether the second waveform of the second voltage signal represents a toggling voltage that preferably has a voltage amplitude of at least the fourth reference voltage. Furthermore, the monitoring unit 142, and preferably the associated processing unit 144 may be configured to detect whether the first waveform of the first voltage signal represents a constant voltage.

In an example, the monitoring unit 142, and preferably the associated processing unit 144 is configured to execute the step F6) in the second process if at least one of the conditions for executing step F5) is not present. Thus, the monitoring unit 142, and preferably the associated processing unit may be configured to execute step F6) if the first waveform of the first voltage signal represents a constant voltage.

In step F6), a determining of an error, referred to as the eighth error, is performed using the processing unit 144 if the second waveform represents a toggling voltage having a voltage amplitude of at least the fourth reference voltage, and further if the first waveform represents a constant voltage. The eighth error represents an interruption of the second signal lines 126. The interruption may also be referred to as an open wire.

It can be concluded from the previous explanations that steps C1) to C5) are carried out initially in the second process in order to create the conditions for carrying out further steps in the second process. Steps C1) to C5) as well as step F1) have the advantage that no negative interference occurs in the signal transmission by the CAN BUS interface 130. Only if the result of step F1) also indicates the further requirement that the sum current from step F1) is less than the third predetermined reference current then, for example, steps F2) to F5) may be executed. A possibly occurring interference with the signal transmission by the CAN BUS interface 130 while executing steps F2) to F5) is acceptable, since the previously mentioned further requirement is a potential indication that an interruption could exist on one of the two CAN signal lines 124, 126.

In an example, the monitoring unit 142, and preferably the associated processing unit 144 is configured to perform steps C1), C2), C3), C4), C5), F1), and D4) or E4) in the second process, as well as the further step G1).

In an example, the monitoring unit 142, and preferably the associated processing unit 144 may be configured to determine whether the sum current from step F1) is greater than a sixth reference current. Preferably, the sixth reference current is 10 mA.

In an example, the monitoring unit 142, and preferably the associated processing unit 144 may be configured to determine whether the difference current from step C5) is between the fourth reference current and the fifth reference current.

Further, the monitoring unit 142, and preferably the associated processing unit 144 may be configured to determine whether the voltage difference is between a fifth reference voltage and the fourth reference voltage. The fifth reference voltage is preferably 0 V or ground potential. The voltage difference is preferably the first voltage difference from step D4) or the second voltage difference from step E4).

In an example, the monitoring unit 142, and preferably the associated processing unit 144 is configured to perform step G1) in the second process. In the step G1, a determining of an error, referred to as the eighth error, is performed using the processing unit 144 if the sum current from step F1) is greater than the sixth reference current, and further if the difference current from step C5) is between the fourth reference current and the fifth reference current, and further if the first or second voltage difference from step D4) or step E4), respectively, is between the fifth reference voltage and the fourth reference voltage. The eighth error represents a short between the first signal lines 124 and the second signal lines 126.

In another embodiment of the present disclosure, a method for error detection at the CAN transceiver 120 or at the CAN signal lines 124, 126 is provided. The CAN signal lines 124, 126 are connectable to the CAN transceiver 12, wherein the CAN transceiver 120 comprises the CAN BUS interface 120, the digital interface 136, the signal generation unit 138, the control unit 140 and the monitoring unit 142. The CAN BUS interface 130 comprises the first terminal 132 configured to be connected to the first CAN signal line 124 and the second terminal 134 configured to be connected to a second CAN signal line 126. The digital interface 136 is configured to receive a digital signal representing a sequence of data bits. The signal generation unit 138 is connected to both terminals 132, 134 and is configured to generate a differential voltage signal between the terminals 132, 134. The method comprises the following steps:

Controlling the signal generation unit 138 using the control unit 140 based on the received digital signal so that a CAN signal representing the data bits is generated at the CAN BUS interface 130;

Detecting using the monitoring unit 142 whether the CAN transceiver 120 is either in a transmitting mode in which the control unit 140 controls the signal generating unit 138 to generate the CAN signal, or in a non-transmitting mode; and Executing, using the monitoring unit 142 and depending on the mode of the CAN transceiver 120 detected by the monitoring unit 142, either a first process for detecting an error on the CAN signal lines or a second process for detecting an error on the transceiver or the CAN signal lines, the first process and the second process being different.

Although the described exemplary embodiments disclosed herein focus on transceivers and methods for using same, the present disclosure is not necessarily limited to the example embodiments illustrate herein.

The transceivers and methods described herein may at least partially be embodied by a computer program or a plurality of computer programs, which may exist in a variety of forms both active and inactive in a single computer system or across multiple computer systems. For example, they may exist as software program(s) comprised of program instructions in source code, object code, executable code or other formats for performing some of the steps. Any of the above may be embodied on a computer-readable medium, which may include storage devices and signals, in compressed or uncompressed form.

The term "processor" or "processing unit" refers to a data processing circuit that may be a microprocessor, a co-processor, a microcontroller, a microcomputer, a central processing unit, a field programmable gate array (FPGA), a programmable logic circuit, and/or any circuit that manipulates signals (analog or digital) based on operational instructions that are stored in a memory. The term "memory" refers to a storage circuit or multiple storage circuits such as read-only memory, random access memory, volatile memory, non-volatile memory, static memory, dynamic memory, Flash memory, cache memory, and/or any circuit that stores digital information.

As used herein, a "computer-readable medium" or "storage medium" may be any means that can contain, store, communicate, propagate, or transport a computer program for use by or in connection with the instruction execution system, apparatus, or device. The computer-readable medium may be, for example but not limited to, an electronic, magnetic, optical, electromagnetic, infrared, or semiconductor system, apparatus, device, or propagation medium. More specific examples (non-exhaustive list) of the computer-readable medium may include the following: an electrical connection having one or more wires, a portable computer diskette, a random-access memory (RAM), a read-only memory (ROM), an erasable programmable read-only memory (EPROM or Flash memory), an optical fiber, a portable compact disc read-only memory (CDROM), a digital versatile disc (DVD), a Blu-ray disc (BD), and a memory card.

It is noted that the embodiments above have been described with reference to different subject-matters. In particular, some embodiments may have been described with reference to method-type claims whereas other embodiments may have been described with reference to apparatus-type claims. However, a person skilled in the art will gather from the above that, unless otherwise indicated, in addition to any combination of features belonging to one type of subject-matter also any combination of features relating to different subject-matters, in particular a combination of features of the method-type claims and features of the apparatus-type claims, is considered to be disclosed with this document.

Furthermore, it is noted that the drawings are schematic. In different drawings, similar or identical elements are provided with the same reference signs. Furthermore, it is noted that in an effort to provide a concise description of the illustrative embodiments, implementation details which fall into the customary practice of the skilled person may not have been described. It should be appreciated that in the development of any such implementation, as in any engineering or design project, numerous implementation-specific decisions must be made in order to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill.

Finally, it is noted that the skilled person will be able to design many alternative embodiments without departing from the scope of the appended claims. In the claims, any reference sign placed between parentheses shall not be construed as limiting the claim. The word "comprise(s)" or "comprising" does not exclude the presence of elements or steps other than those listed in a claim. The word "a" or "an" preceding an element does not exclude the presence of a plurality of such elements. Measures recited in the claims may be implemented by means of hardware comprising several distinct elements and/or by means of a suitably programmed processor. In a device claim enumerating several means, several of these means may be embodied by one and the same item of hardware. The mere fact that certain measures are recited in mutually different dependent claims does not indicate that a combination of these measures cannot be used to advantage. Unless stated otherwise, terms such as "first", "second", "third" etc. are used to arbitrarily distinguish between the elements such terms describe. Thus, these terms are not necessarily intended to indicate temporal or other prioritization of such elements.

The invention claimed is:

1. A controller area network, CAN, transceiver, the transceiver comprising:
   a CAN BUS interface with a first terminal designed for connection to a first CAN signal line and a second terminal designed for connection to a second CAN signal line;
   a digital interface for receiving a digital signal representing a sequence of data bits;
   a signal generation unit connected to the first terminal and the second terminal terminals and configured to generate a differential voltage signal between the terminals;
   a control unit; and
   a monitoring unit;
   wherein the control unit is configured to control the signal generation unit based on the received digital signal such that a CAN signal representing the data bits of the received digital signal is generated at the CAN BUS interface;
   wherein the monitoring unit is configured to detect whether the CAN transceiver is either in a transmitting mode in which the control unit controls the signal generating unit to generate the CAN signal, or in a non-transmitting mode; and
   wherein monitoring unit is configured to execute either a first process for detecting an error at the CAN signal lines or a second process for detecting an error at the CAN transceiver or the CAN signal lines depending on the mode of the CAN transceiver detected by the monitoring unit, wherein the first process and the second process are different.

2. The CAN transceiver of claim 1, wherein the transceiver is configured to change from a working mode, in which the transceiver is ready to transmit signals, to a sleep mode, in which the transceiver is not ready to transmit but is ready to receive a signal, and to change vice versa, wherein the monitoring unit is configured to detect whether the transceiver is in either a working mode or the sleep mode, and wherein the monitoring unit is configured to execute the first or second process only in the working mode.

3. The CAN transceiver of claim 1, wherein the monitoring unit is configured to execute the first process for error detection in non-transmitting mode and the second process for error detection in transmitting mode.

4. The CAN transceiver of claim 1, wherein the monitoring unit comprises a processing unit.

5. The CAN transceiver of claim 4, wherein the monitoring unit comprises a control circuit controllable by the processing unit, wherein a first electrical impedance of the transceiver between the first terminal and a first voltage supply node of the transceiver can be enabled or disabled by the monitoring unit via the control circuit, and wherein a second electrical impedance of the transceiver between the second terminal and a second voltage supply node of the transceiver can be enabled or disabled by the monitoring unit via the control circuit.

6. The CAN transceiver of claim 5, wherein the monitoring unit is configured to execute the first process comprising the following steps:
   detecting a first voltage at the first terminal using a sensor unit of the monitoring unit; and
   detecting a second voltage at the second terminal using the sensor unit; and
   wherein the monitoring unit is configured to further execute the following steps in the first process if the first voltage corresponds to a first reference voltage and the second voltage deviates from the first reference voltage:
   activating the first and second impedance by controlling the control circuit using the processing unit;
   detecting again the first voltage using the sensor unit after activation of the first and second impedance; and
   determining an error as a first error using the processing unit if the first voltage is smaller than the first reference voltage, wherein the first error represents an open wire at the first CAN signal line.

7. The CAN transceiver of claim 6, wherein the monitoring unit is configured to further execute the following steps in the first process if the second voltage corresponds to the first reference voltage and the first voltage differs from the first reference voltage:
   activating the first and second impedances by controlling the control circuit using the processing unit;
   detecting again the second voltage using the sensor unit after activation of the first and second impedance; and
   determining an error as a second error using the processing unit if the second voltage is smaller than the first reference voltage, wherein the second error represents an open wire at the second CAN signal line.

8. The CAN transceiver of claim 6, wherein the monitoring unit is configured to execute the following steps in the second process:
   sequentially detecting a bit duration of each bit of the sequence of data bits represented by the received digital signal; and
   detecting a sub-sequence from at least one bit of the sequence of data bits, wherein each bit of the sub-sequence is a dominant bit and a total duration of the sub-sequence is at least a predetermined reference time;
   wherein the monitoring unit is configured to further execute, in the second process, the following steps in a period of time while the bits of the sub-sequence are represented by CAN signal at the terminals generated by the signal generating unit:
   detecting a first electric current flowing through the first terminal using the sensor unit; and
   detecting a second electric current flowing through the second terminal using the sensor unit; and
   wherein the monitoring unit is configured to further execute the following step in the second process:
   determining a difference current using the processing unit, the difference current representing the difference between the first current and the second current.

9. The CAN transceiver of claim 8, wherein a third electrical impedance of the transceiver between the first terminal and the first voltage supply node of the transceiver can be enabled or disabled by the monitoring unit via the control circuit, wherein a fourth electrical impedance of the transceiver between the second terminal and the first voltage supply node of the transceiver can be enabled or disabled by the monitoring unit via the control circuit, and wherein the monitoring unit is configured to further execute the following steps in the second process if the difference current is less than a first predetermined reference current:
   activating the third and fourth impedance by controlling the control circuit through the processing unit;
   detecting a third voltage at the first terminal using the sensor unit;
   detecting a fourth voltage at the second terminal using the sensor unit;
   determining a first difference voltage using the processing unit, the first difference voltage representing the difference between the third voltage and the fourth voltage; and
   determining an error as a third error using the processing unit if the first difference voltage is at least a second reference voltage, wherein the third error representing an electrical short between the first terminal and the second voltage supply node of the transceiver.

10. The CAN transceiver of claim 9, wherein the monitoring unit is configured to further execute the following step in the second process if the first difference voltage is less than the second reference voltage:
   determining an error as a fourth error using the processing unit if the first difference voltage is less than the second reference voltage, wherein the fourth error representing an electrical short between the second terminal and the second voltage supply node of the transceiver.

11. The CAN transceiver of claim 7, wherein the monitoring unit is configured to execute the following steps in the second process:
   sequentially detecting a bit duration of each bit of the sequence of data bits represented by the received digital signal; and
   detecting a sub-sequence from at least one bit of the sequence of data bits, wherein each bit of the sub-sequence is a dominant bit and a total duration of the sub-sequence is at least a predetermined reference time;
   wherein the monitoring unit is configured to further execute, in the second process, the following steps in a period of time while the bits of the sub-sequence are represented by CAN signal at the terminals generated by the signal generating unit:
   detecting a first electric current flowing through the first terminal using the sensor unit; and
   detecting a second electric current flowing through the second terminal using the sensor unit; and
   wherein the monitoring unit is configured to further execute the following step in the second process:

determining a difference current using the processing unit, the difference current representing the difference between the first current and the second current.

12. The CAN transceiver of claim 11, wherein a third electrical impedance of the transceiver between the first terminal and the first voltage supply node of the transceiver can be enabled or disabled by the monitoring unit via the control circuit, wherein a fourth electrical impedance of the transceiver between the second terminal and the first voltage supply node of the transceiver can be enabled or disabled by the monitoring unit via the control circuit, and wherein the monitoring unit is configured to further execute the following steps in the second process if the difference current is less than a first predetermined reference current:
   activating the third and fourth impedance by controlling the control circuit through the processing unit;
   detecting a third voltage at the first terminal using the sensor unit;
   detecting a fourth voltage at the second terminal using the sensor unit;
   determining a first difference voltage using the processing unit, the first difference voltage representing the difference between the third voltage and the fourth voltage; and
   determining an error as a third error using the processing unit if the first difference voltage is at least a second reference voltage, wherein the third error representing an electrical short between the first terminal and the second voltage supply node of the transceiver.

13. The CAN transceiver of claim 12, wherein the monitoring unit is configured to further execute the following step in the second process if the first difference voltage is less than the second reference voltage:
   determining an error as a fourth error using the processing unit if the first difference voltage is less than the second reference voltage, wherein the fourth error representing an electrical short between the second terminal and the second voltage supply node of the transceiver.

14. The CAN transceiver of claim 13, wherein a fifth electrical impedance of the transceiver between the first terminal and the second voltage supply node of the transceiver can be enabled or disabled by the monitoring unit via the control circuit, wherein a sixth electrical impedance of the transceiver between the second terminal and the second voltage supply node of the transceiver can be enabled or disabled by the monitoring unit via the control circuit, and wherein the monitoring unit is configured to further execute the following steps in the second process if the difference current is greater than a second predetermined reference current, wherein the second reference current is greater than the first reference current:
   activating the fifth and sixth impedance by controlling the control circuit through the processing unit;
   detecting a fifth voltage at the first terminal using the sensor unit;
   detecting a sixth voltage at the second terminal using the sensor unit;
   determining a second difference voltage representing the difference between the fifth voltage and the sixth voltage using the processing unit; and
   determining an error as a fifth error if the second difference voltage is less than a third reference voltage, that is higher than the second reference voltage, using the processing unit, wherein the fifth error represents an electrical short between the first terminal and a first voltage supply node of the transceiver.

15. The CAN transceiver of claim 14, wherein the monitoring unit is configured to further execute the following step in the second process if the second difference voltage is at least the third reference voltage:
   determining an error as a sixth error if the second difference voltage is at least the third reference voltage using the processing unit, wherein the sixth error represents an electrical short between the second terminal and the second voltage supply node of the transceiver.

16. The CAN transceiver of claim 15, wherein the monitoring unit is configured to further execute the following step in the second process:
   determining a sum current using the processing unit, wherein the sum current represents the sum of the first current and the second current; and
   wherein the monitoring unit is configured to further execute the following steps in the second process if the sum current is less than a third reference current and further if the difference current is greater than the fourth reference current and less than a fifth reference current:
   detecting a first voltage signal using the sensor unit and the processing unit, the first voltage signal representing an electrical voltage at the first terminal over at least a predetermined, first time period;
   detecting a second voltage signal using the sensor unit and the processing unit, the second voltage signal representing an electrical voltage at the second terminal over at least the first time period;
   analyzing a first waveform of the first voltage signal and a second waveform of the second voltage signal using the processing unit; and
   determining an error as a seventh error using the processing unit if the first waveform represents a toggling voltage comprising a voltage amplitude of at least a fourth reference voltage and further if the second waveform represents a constant voltage, wherein the seventh error represents an open wire at the first CAN signal line.

17. The CAN transceiver of claim 16, wherein the monitoring unit is configured to further execute the following step in the second process if the first waveform represents a constant voltage:
   determining an error as a eights error using the processing unit if the second waveform represents a toggling voltage comprising a voltage amplitude of at least the fourth reference voltage and further if the first waveform represents a constant voltage, wherein the eights error representing an open wire at the second CAN signal line.

18. The CAN transceiver of claim 17, wherein the monitoring unit is configured to execute the following step in the second process:
   determining an error as an ninth error using the processing unit if the sum current is greater than a sixth reference current, and if further the difference current is between the fourth reference current and the fifth reference current, and further if the first difference voltage or the second difference voltage are between a fifth reference voltage and the fourth reference voltage, respectively, wherein the ninth error represents an electrical short between the first and second signal lines.

19. A method for error detection at a CAN transceiver or at CAN signal lines connectable to the transceiver, wherein the transceiver comprises a CAN BUS interface, a digital interface, a signal generation unit, a control unit and a monitoring unit, wherein the CAN BUS interface comprises a first terminal configured to be connected to a first CAN signal line and a second terminal configured to be connected to a second CAN signal line, wherein the digital interface is configured to receive a digital signal representing a sequence of data bits, wherein the signal generation unit is connected to the first terminal and the second terminal terminals and configured to generate a differential voltage signal between the terminals, and wherein the method comprises the following steps:

controlling the signal generation unit using the control unit based on the received digital signal so that a CAN signal representing the data bits is generated at the CAN BUS interface;

detecting using the monitoring unit whether the CAN transceiver is either in a transmitting mode in which the control unit controls the signal generating unit to generate the CAN signal, or in a non-transmitting mode; and executing, using the monitoring unit and depending on the mode of the CAN transceiver detected by the monitoring unit, either a first process for detecting an error on the CAN signal lines or a second process for detecting an error on the transceiver or the CAN signal lines, the first process and the second process being different.

20. The method of claim 19, wherein the transceiver is configured to change from a working mode, in which the transceiver is ready to transmit signals, to a sleep mode, in which the transceiver is not ready to transmit but is ready to receive a signal, and to change vice versa, wherein the method further comprises:

detecting, using the monitoring unit, whether the transceiver is in either a working mode or the sleep mode, wherein the monitoring unit is configured to execute the first or second process only in the working mode.

* * * * *